US010712613B2

(12) United States Patent
Jung et al.

(10) Patent No.: US 10,712,613 B2
(45) Date of Patent: Jul. 14, 2020

(54) BACKLIGHT UNIT AND DISPLAY DEVICE

(71) Applicant: LG Display Co., Ltd., Seoul (KR)

(72) Inventors: SungHyun Jung, Seoul (KR); Woosang Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/148,875

(22) Filed: Oct. 1, 2018

(65) Prior Publication Data

US 2019/0163021 A1 May 30, 2019

(30) Foreign Application Priority Data

Nov. 30, 2017 (KR) ......................... 10-2017-0163045

(51) Int. Cl.
*G02F 1/13357* (2006.01)

(52) U.S. Cl.
CPC .. *G02F 1/133611* (2013.01); *G02F 1/133605* (2013.01); *G02F 1/133603* (2013.01); *G02F 1/133606* (2013.01); *G02F 1/133608* (2013.01); *G02F 2001/133607* (2013.01)

(58) Field of Classification Search
CPC ......... G02F 1/133611; G02F 1/133605; G02F 1/133603; G02F 1/133606
USPC ...................................................... 362/97.1
See application file for complete search history.

(56) References Cited

U.S. PATENT DOCUMENTS 9,122,100 B2 9/2015 Cho et al.
2008/0252808 A1* 10/2008 Chang ............... G02F 1/133608
349/58

2012/0069248 A1* 3/2012 Yokota ............... G02F 1/133605
348/739
2014/0211121 A1* 7/2014 Cho ................... G02F 1/133603
349/58
2016/0004123 A1* 1/2016 Tanabe .............. G02F 1/133603
362/97.3
(Continued)

FOREIGN PATENT DOCUMENTS

EP 2426395 A1 3/2012
EP 2762957 A1 8/2014
(Continued)

OTHER PUBLICATIONS

Extended European search report, European patent application No. 18202129.5, dated Jan. 7, 2019, 7 pages.
(Continued)

*Primary Examiner* — Christopher M Raabe
(74) *Attorney, Agent, or Firm* — Fenwick & West LLP

(57) ABSTRACT

Some embodiments of the present disclosure relate to a backlight unit and a liquid crystal display device, in a case where an edge area of a cover bottom is formed in an inclined structure, a reflective unit, such as a reflective sheet, forming a step structure is disposed in the boundary between a bottom surface and an inclined surface of the cover bottom, and thus a sufficient amount of light can be uniformly supplied to a lower portion of the panel corresponding to an edge area of the cover bottom. In addition, since a light absorption pattern is applied to a step structure of the reflective unit, improved luminance and uniformity of light can be provided in an area of the panel corresponding to an inner side of the inclined surface and the inclined surface of the cover bottom.

15 Claims, 12 Drawing Sheets

(56) References Cited

U.S. PATENT DOCUMENTS

| | | |
|---|---|---|
| 2016/0091760 A1 | 3/2016 | Ogura et al. |
| 2016/0139463 A1 | 5/2016 | Oh et al. |
| 2017/0023828 A1 | 1/2017 | Lee |
| 2017/0160590 A1 | 6/2017 | Kimme et al. |
| 2017/0219881 A1* | 8/2017 | Shin .................. G02F 1/133605 |
| 2017/0315408 A1* | 11/2017 | Lee .................. G02F 1/133308 |
| 2018/0231939 A1 | 8/2018 | Shimizu |
| 2019/0025654 A1* | 1/2019 | Asamizu ........... G02F 1/133608 |
| 2019/0137829 A1* | 5/2019 | Kim .................. G02F 1/133608 |

FOREIGN PATENT DOCUMENTS

| | | |
|---|---|---|
| EP | 3200017 A2 | 8/2017 |
| TW | I422783 | 1/2014 |
| TW | I550322 | 9/2016 |
| WO | WO 2012/056929 A1 | 5/2012 |
| WO | WO 2016/068592 A1 | 5/2016 |
| WO | WO 2017/094840 A1 | 6/2017 |

OTHER PUBLICATIONS

Japanese Office Action, Japan Patent Application No. 2018-224720, dated Nov. 12, 2019, 4 pages.

\* cited by examiner

FIG. 12

| Case | Ref. | 1 | 2 | 3 |
|---|---|---|---|---|
| PRINTED DENSITY ON A STEP AREA | 0% | 7% | 13% | 20% |
| LUMINANCE DISTRIBUTION | | | | |
| SCREEN PICTURES | | | | |
| LEVELS OF BRIGHT LINES AT THE FRONT PORTION OF A STEP | LEVEL 3 | LEVEL 2 | LEVEL 1 | LEVEL 1.5 (RECOGNIZING OF DARK AREAS) |

BACKLIGHT UNIT AND DISPLAY DEVICE

CROSS-REFERENCE TO RELATED APPLICATION

This application claims the priority benefit of Republic of Korea Patent Application No. 10-2017-0163045, filed on Nov. 30, 2017 in the Republic of Korea Intellectual Property Office, the disclosure of which is incorporated by reference in its entirety.

BACKGROUND

Technical Field

The present disclosure relates to a backlight unit and a display device.

Discussion of the Related Art

As the information-oriented society has developed, there has been a growing need for display devices for displaying an image. Recently, various types of display devices, such as a liquid crystal display (LCD) device, a plasma display panel (PDP) device, and an organic light emitting display (OLED) device, have been developed and utilized.

Among these display devices, the liquid crystal display device, by applying a varying electric voltage to liquid crystals arranged in a display panel, allows the alignment of liquid crystals to vary, and thereby produces a visible image according to image data. In this case, the liquid crystal display device may include some components, such as a backlight unit supplying light to the liquid crystals arranged in the display panel.

Such a backlight unit has recently been reduced in thickness as a need for a slimmer display device has grown. As the thickness of the backlight unit reduces, an optical gap between a diffusion plate and a reflective plate reduces, and as a result, there arises a problem that light cannot be supplied sufficiently to a specific area of the display panel.

In addition, by various needs on the appearance of the display device, an edge area of the slimed backlight unit may have an inclined structure. In this case, light is not sufficiently supplied to a specific area or concentrates in a specific area, and as a result there arises a problem that the uniformity of display brightness is lowered.

SUMMARY

It is an object of the present disclosure to provide a backlight unit and a display device preventing a dark area occurring in a case where the light supplied by the backlight unit having a slimmed structure not gets sufficiently supplied to a specific area of the display panel.

It is another object of the present disclosure to provide a backlight unit and a display device preventing a bright line occurring in a case where the light supplied by a slimmed backlight unit concentrates in a specific area of the display panel.

According to one aspect consistent with various embodiments of the present disclosure, provided is a display device comprising a display panel, and a backlight unit supplying light to a lower portion of the display panel and including a cover bottom having a bottom surface and a inclined surface connected to an edge area of the bottom surface and be formed in an inclined shape, a reflective unit including a first part disposed in the bottom surface, a second part connected to the first part and having a first angle with respect to the first part and a third part connected to the second part and having a second angle with respect to the second part, and at least one light source emitting light on the reflective unit.

According to another aspect consistent with various embodiments of the present disclosure, provided is a backlight unit comprising a cover bottom including a bottom surface and a inclined surface connected to an edge area of the bottom surface and be formed in inclined shape, a reflective unit including a first part disposed in the bottom surface, a second part connected to the first part and having a first angle with respect to the first part and a third part connected to the second part and having a second angle with respect to the second part, and at least one light source emitting light on the reflective unit.

According to yet another aspect consistent with various embodiments of the present disclosure, provided is a backlight unit comprising a cover bottom in which at least a part of an area adjacent to an edge area is bent, a reflective unit disposed on the cover bottom, and at least one light source emitting light. The reflective unit is first bent at a point or portion corresponding to a point or portion where the cover bottom starts to bend and second bent at between the first bent area and an edge area of the reflective unit.

In accordance with some embodiments of the present disclosure, a slimmed backlight unit is provided with a reflective unit disposed on a peripheral area of the backlight unit and having a bent structure, and thus a dark area occurring in a case where light is not sufficiently supplied to a specific area of a display panel can be prevented.

In accordance with some embodiments of the present disclosure, a light absorption pattern is applied, at a constant density, to a portion forming a step in a reflective unit having a bent structure, and thus a bright line occurring in a case where light concentrates in a specific area of a display panel can be prevented.

In accordance with some embodiments of the present disclosure, provided are a backlight unit and a display device having a uniform brightness, by preventing a phenomenon that light supplied from the slimed backlight unit not gets supplied to or concentrates in a specific area.

BRIEF DESCRIPTION

FIG. 12 is a view illustrating the results of measuring the display quality of the backlight unit according to the density of the absorption pattern applied to the reflective sheet illustrated in FIG. 9.

DETAILED DESCRIPTION

Figure 1:
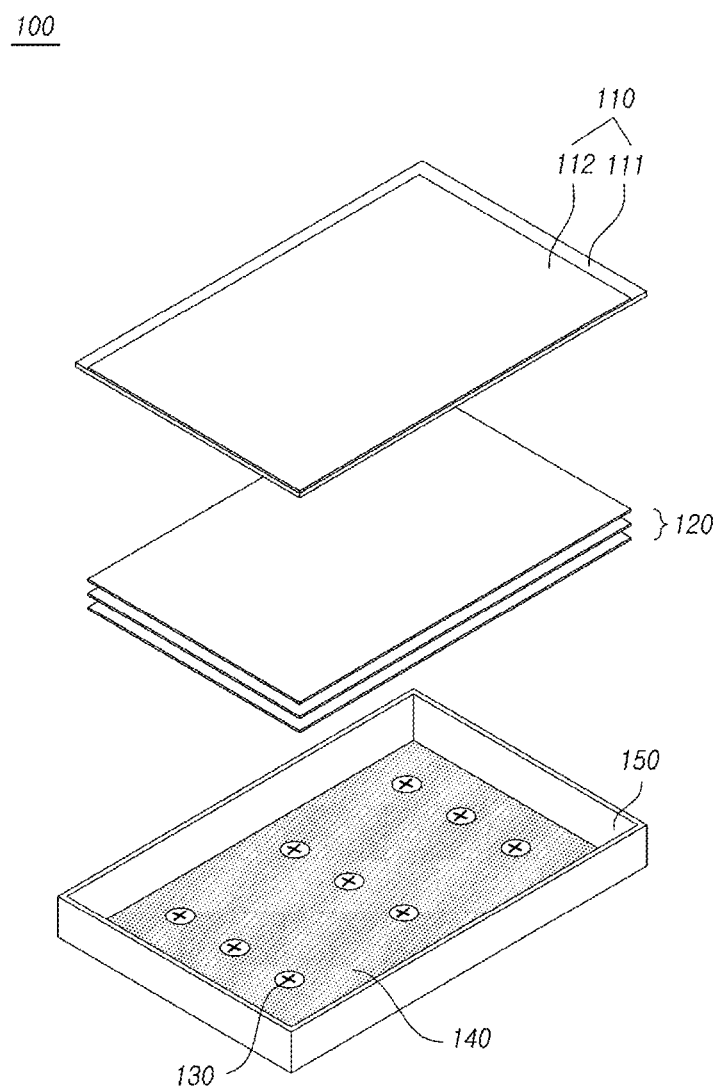
FIG. 1 is a view schematically illustrating a liquid crystal display device according to some embodiments of the present disclosure.

Hereinafter, the present embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a view schematically illustrating a liquid crystal display device 100 according to some embodiments of the present disclosure.

Referring to FIG. 1, a liquid crystal display device 100 according to some embodiments of the present disclosure may include a display panel 110 displaying an image, a backlight unit supplying light to the display panel 110, and a chassis unit for fastening each element included in the liquid crystal display device 100.

The display panel 110 may include a thin film transistor, a first substrate 111 in which various signal lines and the like are disposed, and a second substrate 112 in which a color filter is disposed.

The backlight unit may include a light source or a light source device 130 disposed at a lower portion of the display panel 110 and emitting light to the display panel 110.

Such a light source 130 may be located on a side surface of the display panel 110, called an edge type, or a lower portion of the display panel 110, called a directly-under type, according to a type of the backlight unit.

FIG. 1 illustrates a directly-under type of backlight unit, and a light source 130, or a light source device including a light source 130, a lens, and the like may be disposed at a lower portion of the display panel 110.

In a case where an edge type of backlight unit is used, the light source 130 is disposed on a side surface of the display panel 110, and a light guide plate may be further included to guide light emitted from the light source 130 toward the display panel 110.

The backlight unit may include at least one sheet, such as a diffusion sheet (or a diffusion plate) 120 or the like, for diffusing light, at an upper portion of the light source 130 or the light guide plate. In addition, the backlight unit may include a reflective sheet (or a reflective plate) 140, for improving light efficiency, at a lower portion of either the light source 130 or the light guide plate.

As an example of such a reflective sheet 140, a reflective unit may be included, to improve light efficacy, inside the backlight unit. Such a reflective unit, as in the above example, may be a reflective sheet 140 using scattering effects in a PET base having an air layer therein, or be a reflection surface formed by surface treatment such as anodizing on PET, plastic or metal surface. As another embodiment, the reflective unit may be formed of a reflective metal surface.

That is, the reflective unit included in the backlight unit may be provided using various methods or configurations, such as by forming an air layer inside a member, by performing surface treatment on a member, by using a reflective member, or the like, or be provided with various types or forms capable of reflecting light emitted from a light source 130 toward the display panel 110. Hereinafter, for convenience of description, a reflective sheet 140 is described as an exemplary embodiment, and various types of reflective unit which can be applied to the backlight unit can be included in some embodiments of the present disclosure.

Such a reflective sheet 140, by reflecting light emitted from a light source 130, causes an amount of light reaching a diffusion sheet 120 to increase and thus increases light efficiency.

A chassis unit may serve to fasten or protect elements consisting the liquid crystal display device 100, such as a display panel 110, a backlight unit and the like, and include a guide panel, a cover bottom 150, or the like.

A side surface of the cover bottom 150 may be formed in an inclined structure in accordance with a need for a slimmer liquid crystal display device 100 and a better appearance. As another embodiment, a side surface of the cover bottom 150 may be formed in a gradually bent structure.

Figure 2:
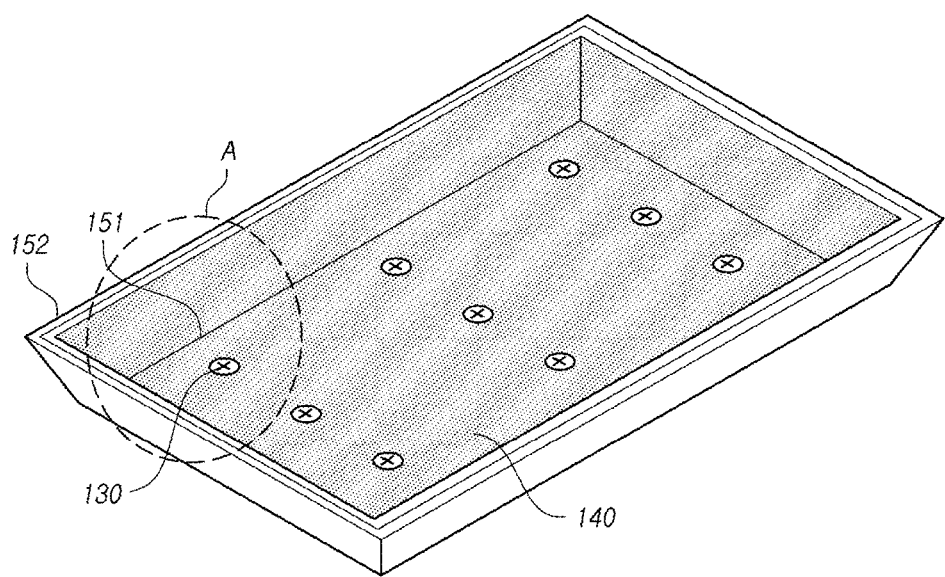
FIGS. 2 and 3 are views illustrating an example of a backlight unit having a slimmed structure in a liquid crystal display device according to some embodiments of the present disclosure.
Figure 3:
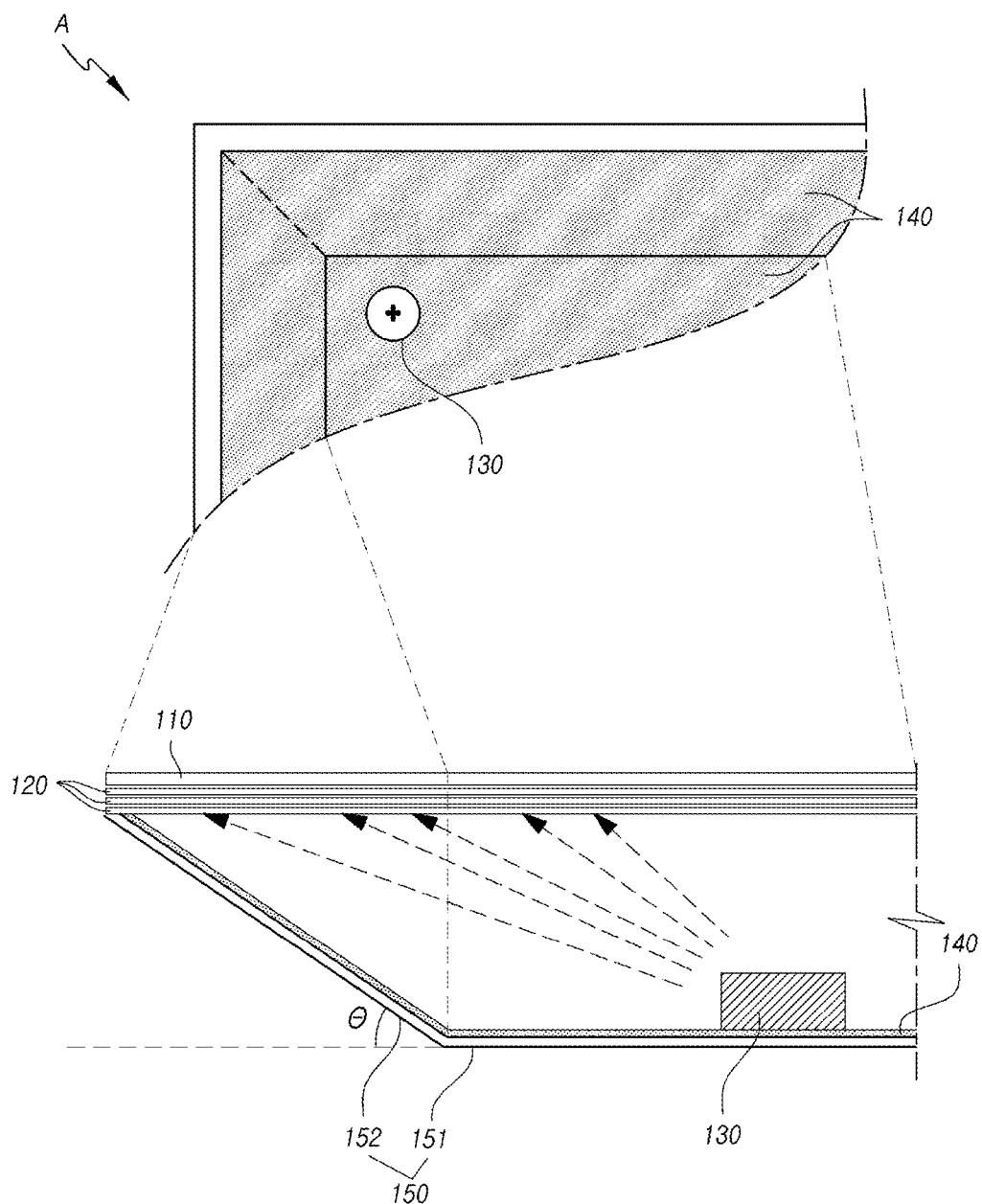

FIGS. 2 and 3 are views illustrating examples of a backlight unit and a cover bottom 150 having a slimmed structure in a liquid crystal display device 100 according to some embodiments of the present disclosure.

Referring to FIG. 2, a cover bottom 150 of a backlight unit according to some embodiments of the present disclosure includes a bottom surface 151 in which a light source 130 is disposed and an inclined surface 152 connected to an edge area of the bottom surface 151 and forming an inclined shape.

All or at least one of side surfaces of the cover bottom 150 may have an inclined surface 152.

The inclined surface 152 of the cover bottom 150 may formed in a structure outwardly inclined relative to a line perpendicular to the bottom surface 151, or may be formed with various angles of inclination such as 30°, 45°, 60°, or the like.

Since at least one side surface of the cover bottom 150 is formed in the inclined structure, the appearance of the liquid crystal display device 100 to which the slim design is applied can be further improved.

In addition, since the cover bottom 150 includes the bottom surface 151 and the inclined surface 152, thereby the area of the bottom surface 151 can reduce and then the number of light sources 130 disposed on the bottom surface 151 can reduce.

Accordingly, while a backlight unit including a cover bottom 150 having a side surface as an inclined surface 152 provides benefits in terms of design and cost, there arises a problem that light cannot be sufficiently supplied to an area of the display panel 110 corresponding to the inclined surface 152.

FIG. 3 is an enlarged view of the inclined surface 152 and a portion adjacent to the inclined surface 152 in the backlight unit as shown in FIG. 2.

Referring to FIG. 3, the cover bottom 150 may include the bottom surface 151 and the inclined surface 152 connected to the bottom surface 151 and forming an inclined shape.

A reflective sheet 140 may be disposed on the bottom surface 151 and the inclined surface 152 of the cover bottom 150, and at least one light source 130 may be located on the bottom surface 151. In addition, a diffusion sheet 120 supported by an edge area of the cover bottom 150 may be disposed in a lower portion of the display panel 110.

As the cover bottom 150 includes the bottom surface 151 and the inclined surface 152, the distance between an outer edge of the cover bottom 150 and a light source 130 disposed outermost of a plurality of light sources 130 disposed in the cover bottom 150 increases.

Accordingly, an amount of the light reaching the edge area of the cover bottom 150 among light emitted from the light source 130 reduces, and therefore the light may not be sufficiently supplied to an area corresponding to the inclined surface 152 of the cover bottom 150 in the display panel 110.

In addition, even though a reflective sheet 140 is disposed on the inclined surface 152, an amount of the light incident on the inclined surface 152 is small, and the light reflected by the reflective sheet 140 disposed along the inclined surface 152 may concentrate in a specific area.

Figure 4:
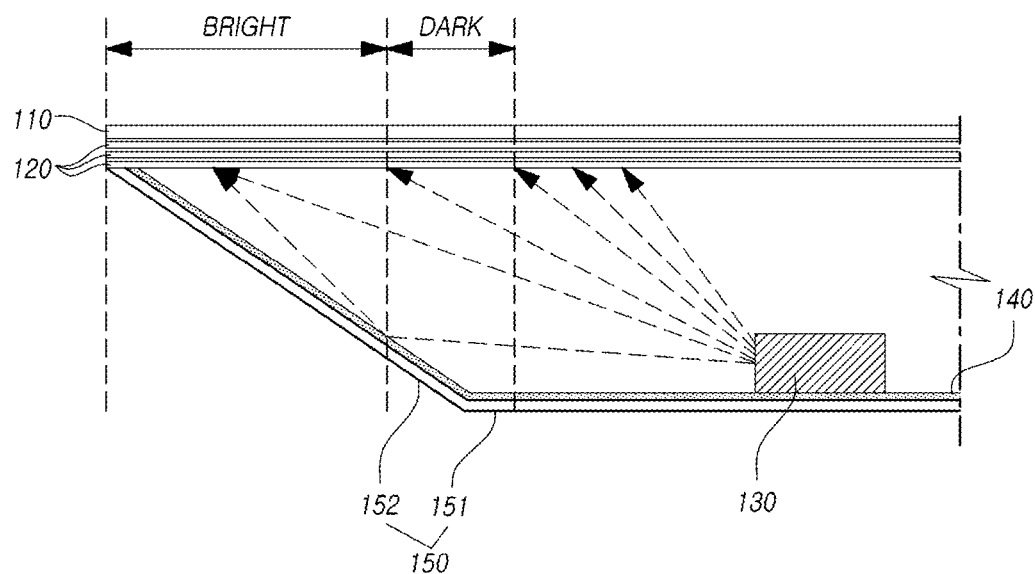
FIG. 4 is a view illustrating an example of a phenomenon that light is not uniformly supplied to a specific area in a backlight unit according to some embodiments of the present disclosure.

FIG. 4 illustrates examples of the brightness displayed on the display panel 110 and the light supplied to an area corresponding to the inclined surface 152 of the cover bottom 150 in the structure of the backlight unit illustrated in FIG. 3

Referring to FIG. 4, as light cannot be sufficiently supplied to an area corresponding to the inclined surface 152 of the cover bottom 150, the corresponding area can appear dark on the display panel 110.

In particular, the screen can appear dark in an area corresponding to a portion adjacent to the boundary between the cover bottom 150 and the inclined surface 152 of the bottom surface 151.

The light reflected by the reflective sheet 140 disposed on the inclined surface 152 can concentrate in a specific area. Thus, the light can concentrate in an edge area of the cover bottom 150, and the concentrated area can appear rather bright.

Accordingly, in a structure in which an outer edge of the cover bottom 150 has an inclined surface 152, an area corresponding to the boundary between the inclined surface 152 and the bottom surface 151 can appear dark and an area corresponding to an outer edge of the inclined surface 152 can appear bright. In addition, since a part can appear bright but another part can appear dark, in an area or within adjacent areas, therefore the uniformity of brightness appearing in the display panel 110 may be further degraded.

In accordance with some embodiments of the present disclosure, in a backlight unit having such a slimmed structure and an inclined structure, provided are a reflective sheet 140 and a backlight unit so that light can be uniformly supplied to a lower portion of an outer edge of the display panel 110.

Figure 5:
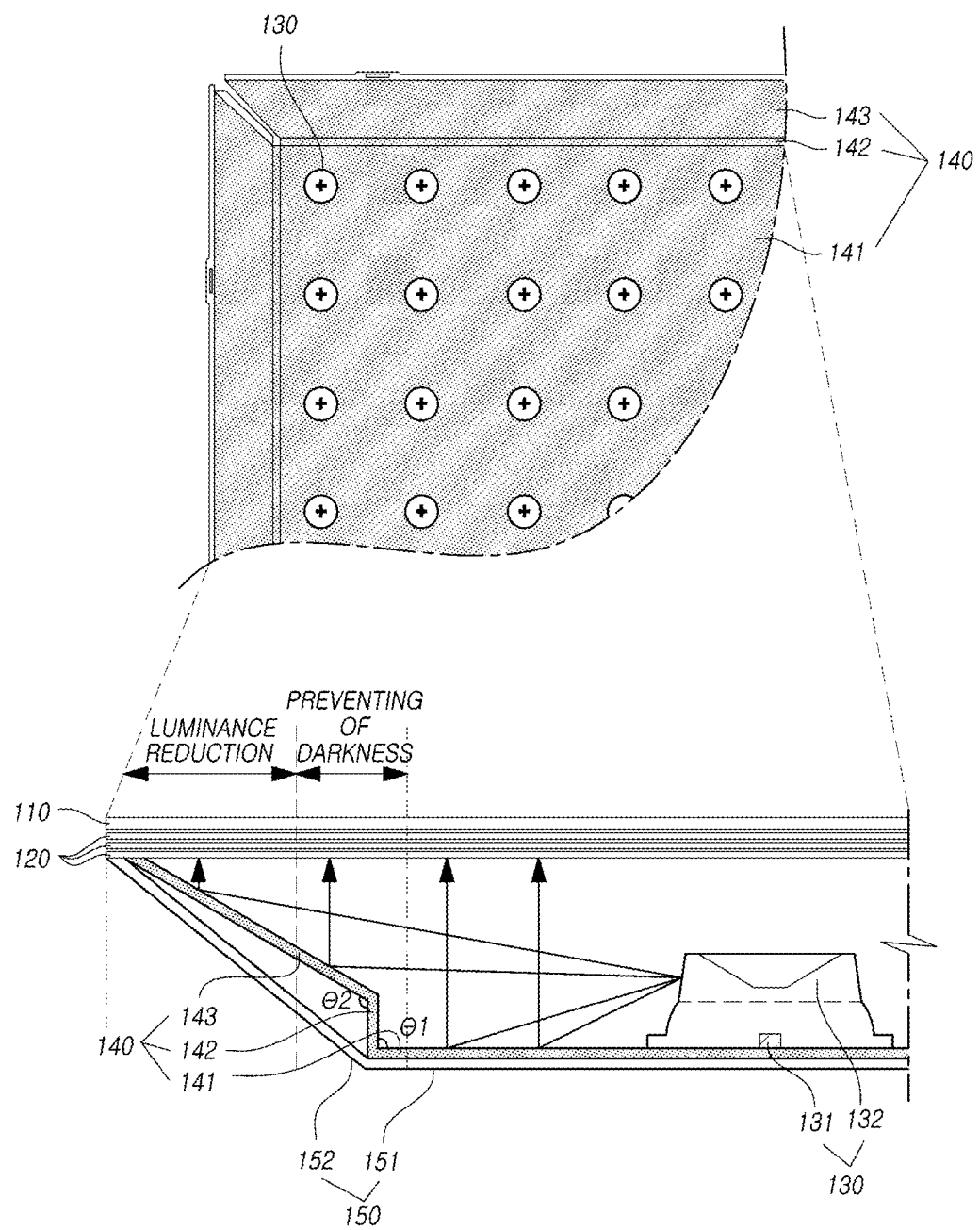
FIGS. 5 and 6 are views illustrating an example of a reflective sheet improving the uniformity of the light supplied to a specific area in a backlight unit according to some embodiments of the present disclosure.
Figure 6:
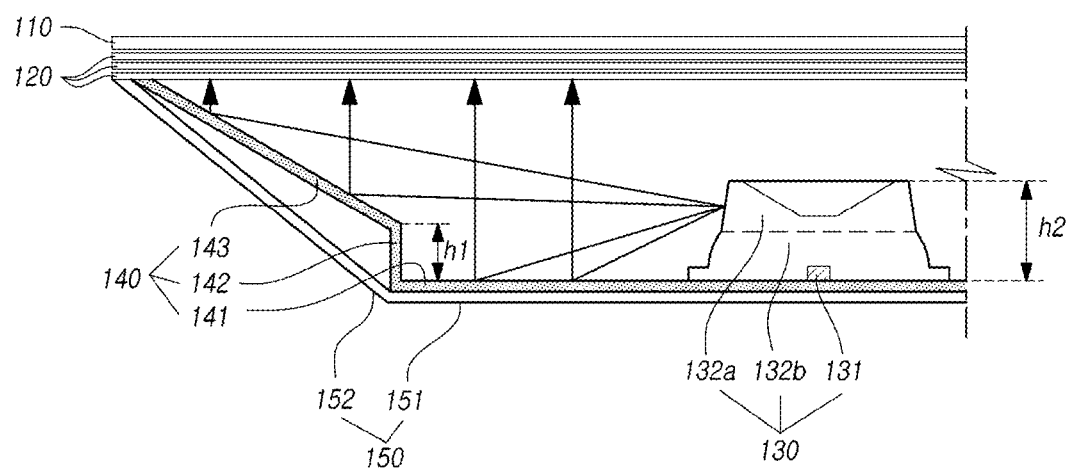

FIGS. 5 and 6 illustrate examples of an area adjacent to an inclined surface 152 of a cover bottom 150, and a reflective sheet 140 and a light source 130 disposed in the adjacent area, in a backlight unit according to some embodiments of the present disclosure.

Referring to FIG. 5, the cover bottom 150 of the backlight unit according to some embodiments of the present disclosure includes a bottom surface 151 and an inclined surface 152 connected to the bottom surface 151 and having an inclined structure.

In this case, at least one light source 130 may be disposed on the bottom surface 151. Such a light source 130 may include a light emitting device, such as a LED package 131, and a lens 132.

A diffusion sheet 120 is supported by an edge area of the cover bottom 150 and may be disposed apart from the light source 130 located on the bottom surface 151.

In this case, the reflective sheet 140 may be disposed between an upper surface of the cover bottom 150 and the light source 130.

Such a reflective sheet 140 may have a bent structure at the boundary between the bottom surface 151 of the cover bottom 150 and the inclined surface 152, and, with the bent structure applied, a step structure may be formed at the boundary between the bottom surface 151 of the cover bottom 150 and the inclined surface 152.

For example, the reflective sheet 140 may include a first part 141 disposed on the bottom surface 151 of the cover bottom 150, a second part 142 connected to the first part 141 and having a first angle θ1 relative to the first part 141, and a third part 143 connected to the second part 142 and having a second angle θ2 relative to the second part 142.

The first part 141 of the reflective sheet 140 may be disposed on the bottom surface 151 of the cover bottom 150, and at least one light source 130 may be disposed on the first part 141.

The second part 142 of the reflective sheet 140 may have a first angle θ1 relative to the first part 141 of the reflective sheet 140, and as an embodiment, the first angle θ1 may be 90°.

One end of the third part 143 of the reflective sheet 140 may be connected to the second part 142 of the reflective sheet 140, and another end of the third part 143 may meet an edge area of the inclined surface 152 of the cover bottom 150.

The third part 143 of the reflective sheet 140 may have a second angle θ2 relative to the second part 142 of the reflective sheet 140, and the second angle θ2 may be greater than the first angle θ1.

That is, the reflective sheet 140 may be bent in a first direction, such as clockwise, in a portion in which the first part 141 and the second part 142 are connected to each other, and be bent in a second direction, such as counter-clockwise, opposite to the first direction, in a portion in which the second part 142 and the third part 143 are connected to each other.

Accordingly, the second part 142 of the reflective sheet 140 may be formed in a step structure at the boundary between the bottom surface 151 and the inclined surface 152 of the cover bottom 150, and, by the second part 142 having the step structure, an amount of the light incident on an area corresponds to the inclined surface 152 can be adjusted.

In addition, at the boundary between the bottom surface 151 and the inclined surface 152, a portion in which the second part 142 and the third part 143, of the reflective sheet 140 are connected to each other is located at an upper vertical height than the bottom surface 151, and thus the third part 143 of the reflective sheet 140 locates closer to the display panel 110.

As the third part 143 of the reflective sheet 140 locates closer to the display panel 110, an amount of light supplied to an area of the display panel 110 corresponding to the boundary between the bottom surface 151 and the inclined surface 152, of the cover bottom 150, can be increased.

With the step structure of the reflective sheet 140, an amount and direction of light supplied to an area of the display panel 110 corresponding to inclined surface 152 of the cover bottom 150, can be adjusted. Accordingly, luminance at the boundary between the bottom surface 151 and the inclined surface 152 is increased and luminance at an edge area of the inclined surface 152 is decreased. Thus, the uniformity of the overall brightness can be improved.

A vertical height of the second part 142 having the step structure of the reflective sheet 140 and the size of the first angle θ1 and the second angle θ2, of the second part 142 relative to the first part 141 and the third part 143 may be set to an optimal value according to an inclination angle of the inclined surface 152 of the cover bottom 150.

In addition, since the expansion and contraction of the reflective sheet 140 may occur, the first angle θ1 between the first part 141 and the second part 142 of the reflective sheet 140 may be set to be in the range of 80° to 100°, and thus, even if the expansion or contraction of the reflective sheet 140 occurs, the first angle θ1 can be maintained at an angle close to 90°.

In this case, a vertical height of the second part 142 having the step structure of the reflective sheet 140 may be determined according to a height of the highest point of the light source 130 disposed on the bottom surface 151 of the cover bottom 150.

In addition, the light source 130 disposed on the reflective sheet 140 may include a lens 132 having a structure suitable for a structure of a slimmed backlight unit.

Referring to FIG. 6, a reflective sheet 140 disposed on the inclined surface 152 and the bottom surface 151 of the cover bottom 150 may include a first part 141, a second part 142 and a third part 143.

The reflective sheet 140 may be first bent at a portion in which the first part 141 and the second part 142 are connected to each other and secondly bent at a portion in which the second part 142 and the third part 143 are connected to each other, and thus the second part 142 may be formed in a step structure.

The vertical height h1 of the second part 142 may be lower than the height h2 of the highest point of the light source 130 disposed on the first part 141 of the reflective sheet 140.

That is, in a case where a step structure is applied to the reflective sheet 140 to adjust both an amount of light incident on an area corresponding to the inclined surface 152 of the cover bottom 150 and a direction of reflection light, the height of the step can be set to be lower than the height of the highest point of the light source 130. Thus, the reduction of an amount of the light incident on the corresponding area can be minimized and the uniformity of the light supplied to a lower portion of the display panel 110 from an area corresponding to the inclined surface 152 can be improved.

In addition, a light source 130 including a lens 132 capable of simultaneously providing light diffusivity and light orientation is disposed in a slimmed backlight unit, and thus a sufficient amount of light may be supplied to an area corresponding to the inclined surface 152.

As an example, a light source 130 disposed on the first part 141 of the reflective sheet 140 may include a light emitting device (LED) package 131 and a lens 132. In this case, the lens 132 may include an upper portion 132a having a concave outer surface and a lower portion 132b having a convex outer surface.

Since the outer surface of the upper portion 132a of the lens 132 is formed in a concave shape, this concave shape enables the orientation of the light emitted through the upper portion 132a to increase and allows the light to be emitted to suit a structure of a slimmed backlight unit.

Since the outer surface of the lower portion 132b of the lens 132 is formed in a convex shape, this convex shape enables the diffusivity of the light emitted through the lower portion 132b to increase. Accordingly, since a lens having a big orientation is used, the luminance of the light emitted from the light source 130 is prevented from being decreased.

Likewise, in accordance with some embodiments, in a structure of a slimmed backlight unit, using the step structure of the reflective sheet 140 and the lens 132 structure of the light source 130, the light incident on an area corresponding to the inclined surface 152 of the cover bottom 150 can be uniformly supplied to the display panel 110.

In addition, such a step structure of the reflective sheet 140 may be applied to a structure in which an edge area of the cover bottom 150 is not sharply bent to have an inclined shape and, but gradually bent.

Figure 7:
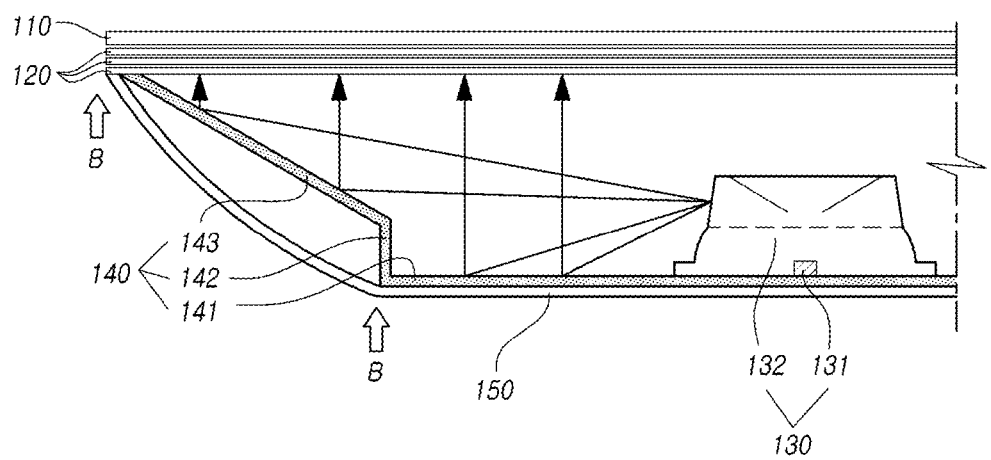
FIG. 7 is a view illustrating another example of a backlight unit and a reflective sheet according to some embodiments of the present disclosure.

FIG. 7 is a view illustrating another example of a backlight unit and a reflective sheet according to some embodiments of the present disclosure.

Referring to FIG. 7, at least one part of an edge area of a cover bottom 150 in a backlight unit according to some embodiments of the present disclosure may be formed in a gradually bent shape.

A reflective sheet 140 being bent and forming a step may be disposed on the cover bottom 150. A light source 130 including a lens 132 simultaneously providing light diffusivity and light orientation may be disposed on the reflective sheet 140.

The reflective sheet 140 may be bent first in a first direction at a point B at which the cover bottom 150 starts to bend. The reflective sheet 140 may be bent second in a second direction opposite to the first direction at between the first bent portion of the reflective sheet 140 and an edge area of the reflective sheet 140. That is, the reflective sheet 140 is bent second and may be disposed in a manner that an edge area of the reflective sheet 140 meets a point B which is an edge area of the cover bottom 150.

A portion corresponding to between the first bent portion and the second bent portion of the reflective sheet 140 may be perpendicular to the cover bottom 150.

Such a step structure of the reflective sheet 140 causes an amount of light incident on an area corresponding to an edge area of the cover bottom 150 to decrease, and thus an amount of light concentrating in an edge area of the display panel 110 can be decreased.

The light reflected from a portion corresponding to between the second bent portion and an edge area, of the reflective sheet 140 can be sufficiently supplied to an area of the display panel 110 corresponding to a point B at which the cover bottom 150 starts to bend.

Accordingly, in a case where the step structure of the reflective sheet 140 according to some embodiments of the present disclosure is applied, even if an edge area of the cover bottom 150 is formed in a bent or curved structure, light can be uniformly supplied to a lower portion of the display panel 110 corresponding to the edge area of the cover bottom 150.

As a result, bright lines and dark areas appearing in the edge area of the display panel 110 in the liquid crystal display device 100 including the slimmed backlight unit can be prevented, and thereby the uniformity of overall brightness can be improved.

Meanwhile, the step structure of such a reflective sheet 140 can enable the uniformity of brightness in an edge area of the display panel 110 to improve, but this step structure may allow a bright line to appear in an area corresponding to an inner side of the inclined surface 152 of the cover bottom 150.

Figure 8:
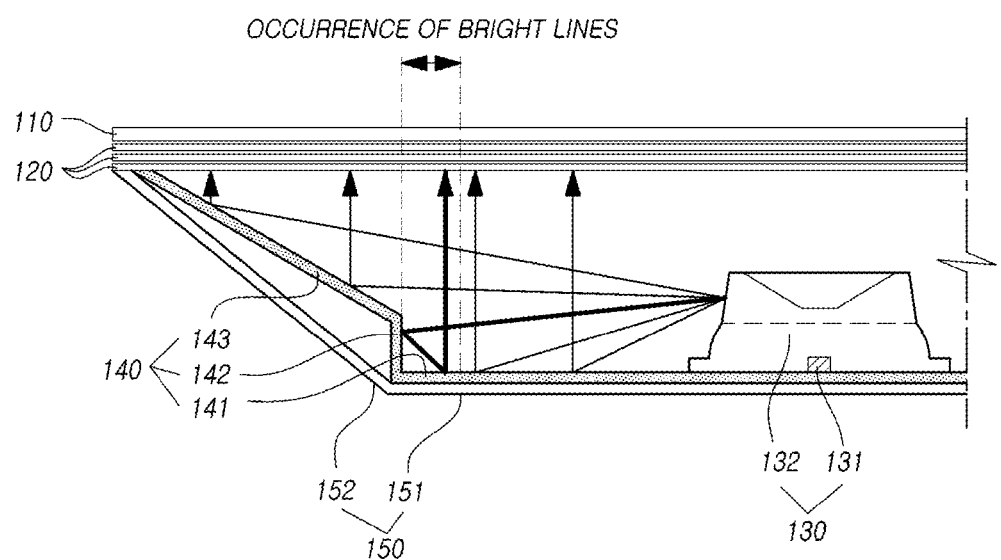
FIG. 8 is a view illustrating an example of a phenomenon that light concentrates in a specific area in a backlight unit according to some embodiments of the present disclosure.

FIG. 8 is a view illustrating an example of a phenomenon that light concentrates in a specific area in a case where a reflective sheet 140 is applied which has a step structure in a backlight unit according to some embodiments of the present disclosure.

Referring to FIG. 8, a cover bottom 150 of the backlight unit includes a bottom surface 151 and an inclined surface 152.

a reflective sheet 140 having a step structure in which the reflective sheet 140 is bent twice is disposed on the cover bottom 150, and at least one light source 130 may be located on the bottom surface 151.

The reflective sheet 140 may include a first part 141 disposing on the bottom surface 151 of the cover bottom 150 and a second part 142 formed in a step structure, and a third part 143 located on the inclined surface 152.

The light emitted from the light source 130 may be reflected from the first part 141, second part 142 and third part 143 of the reflective sheet 140 and be supplied to a lower portion of the display panel 110.

In this case, the second part 142 of the reflective sheet 140 is formed in a step structure, and thus enables the uniformity of the light supplied to an edge area of the display panel 110 to improve. However, the light incident from the second part 142 may be reflected to the first part 141 and be supplied to the display panel 110.

That is, an amount of the light supplied to an area of the display panel 110 corresponding to an inner side of the inclined surface 152 of the cover bottom 150 may increase by the light reflected from the second part 142 of the reflective sheet 140.

Accordingly, the second part 142 forming the step structure of the reflective sheet 140 can improve the uniformity of brightness in an edge area of the display panel 110, but may cause a bright line to appear in an area of the display panel 110 corresponding to an inner side of the inclined surface 152.

In some embodiments of the present disclosure, the reflective sheet 140 is formed in the step structure, and thereby the uniformity of brightness in an edge area of the display panel 110 can be improved. At the same time, provided is a reflective sheet 140 capable of preventing a bright line appearing in an area of the display panel 110 corresponds to an inner side of the inclined surface 152 of the cover bottom 150.

Figure 9:
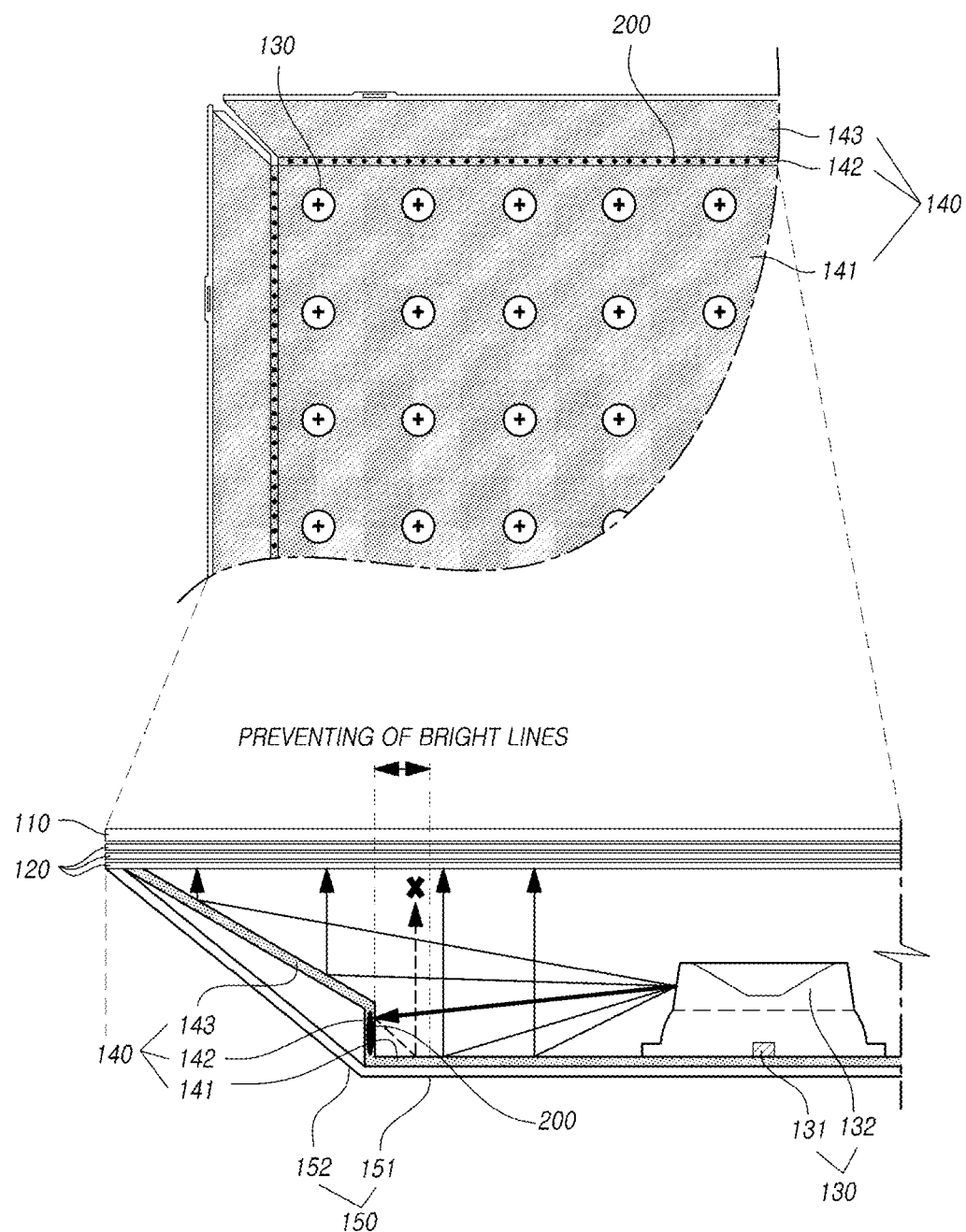
FIG. 9 is a view illustrating an example of a reflective sheet to which a light absorption pattern is applied such that the concentrating of light in a specific area can be prevented in a backlight unit according to some embodiments of the present disclosure.

FIG. 9 is a view illustrating an example of a reflective sheet to which a light absorption pattern 200 is applied on a second part 142 of the reflective sheet 140 in a backlight unit according to some embodiments of the present disclosure.

Referring to FIG. 9, a cover bottom 150 of the backlight unit according to some embodiments of the present disclosure includes a bottom surface 151 and an inclined surface 152. A reflective sheet 140 having a step structure in which the reflective sheet 140 is bent twice is disposed on the cover bottom 150. In this case, at least one light source 130 may be disposed on the bottom surface 151.

The reflective sheet 140 may include a first part 141 disposing on the bottom surface 151 of the cover bottom 150 and a second part 142 formed in a step structure, and a third part 143 located on the inclined surface 152.

In this case, in the second part 142 of the reflective sheet 140, at least one a light absorption pattern 200 may be disposed on a surface on which light emitted from the light source 130 is incident.

Such a light absorption pattern 200 causes light incident from the light source 130 so as not to be reflected, and as an example, may be a pattern in which at least one black dot pattern is printed.

Since the light absorption pattern 200 is disposed on second part 142 of the reflective sheet 140, at least a part of light incident on the second part 142 is prevented from being reflected.

Since an amount of light reflected from the second part 142 of the reflective sheet 140 is decreased, an amount of light supplied to a lower portion of the display panel 110 through the first part 141 of the light reflected from the second part 142 can be decreased.

Accordingly, a bright line resulted from the concentrating of light to an area of the display panel 110 corresponding to an inner side of the inclined surface 152 of the cover bottom 150 can be prevented.

That is, according to some embodiments of the present disclosure, since provided is a reflective sheet 140 having a step structure formed at the boundary between the cover bottom 150 and the inclined surface 152 of the bottom surface 151, light can be uniformly supplied to an area of the display panel 110 corresponding to an edge area of the cover bottom 150.

Since the light absorption pattern 200 is disposed on a surface, on which light is incident, included in the step structure formed in the reflective sheet 140, thus light is prevented from being concentrated in an area of the display panel 110 corresponding to an inner side of the inclined surface 152.

Accordingly, since light can be sufficiently uniformly supplied to an area of the display panel 110 corresponding to between a light source 130 disposed in the outermost area among a plurality of light sources 130 disposed in the cover bottom 150 and an outer edge of the cover bottom 150, thus provided are a backlight unit and a liquid crystal display device 100, in which luminance and the uniformity of light are improved.

The density or size of the light absorption pattern 200 disposed in the second part 142 of such a reflective sheet 140 may be differently disposed according to which location the light absorption pattern 200 is disposed in.

Figure 10:
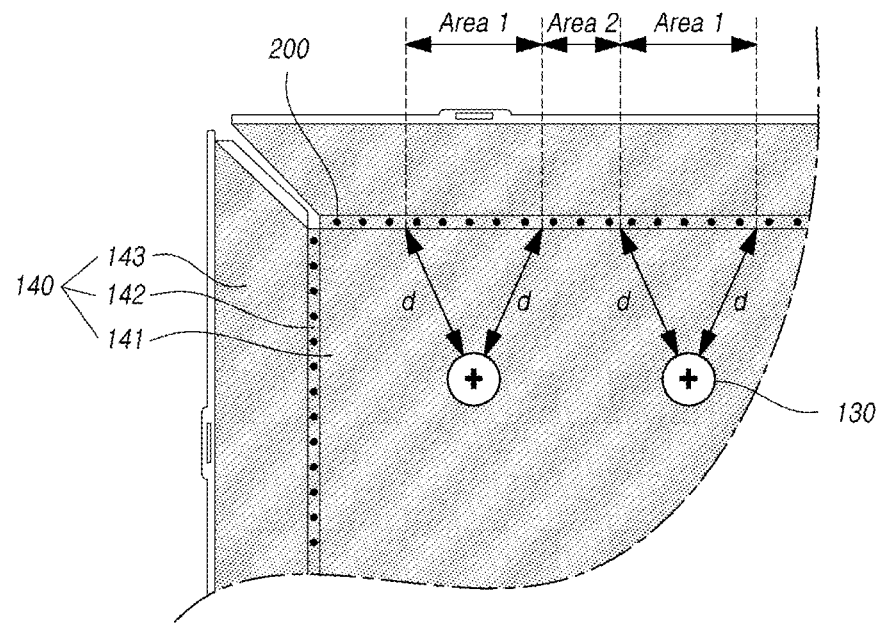
FIG. 10 is a view illustrating an example of the absorption pattern applied to the reflective sheet illustrated in FIG. 9.

FIG. 10 is a view illustrating an example of the absorption pattern 200 applied to the reflective sheet 140 illustrated in FIG. 9.

Referring to FIG. 10, a reflective sheet including 140 a first part 141, second part 142 and third part 143 may be disposed on the cover bottom 150 including the inclined surface 152. In this case, at least one light source 130 may be disposed on the first part 141 of the reflective sheet 140.

At least one light absorption pattern 200, in order to reduce the reflecting of light incident from the light source 130, may be disposed on the second part 142 of the reflective sheet 140.

The density or size of the light absorption pattern 200 disposed in such a second part 142 may be different depending on a straight-line distance between the light absorption pattern 200 and the light source 130 disposed closest to the second part 142.

As an example, the second part 142 of the reflective sheet 140 may include a first area Area 1 and a second area Area 2 located at a distance respectively longer than and shorter than and equivalent to, a predetermined distance d corresponding to a straight-line distance between a light source 130 disposed in the outermost area of a plurality of light sources 130 and the second part 142.

In this case, the density of the light absorption pattern 200 disposed in the first area Area 1 of the second part 142 may be greater than that of the light absorption pattern 200 disposed in the second area Area 2.

The size of the light absorption pattern 200 disposed in the first area Area 1 of the second part 142 may be greater than that of the light absorption pattern 200 disposed in the second area Area 2.

That is, the light absorption pattern 200 can be designed to have a relatively large density or size in an area at which a distance from a light source 130 to the second part 142 of the reflective sheet 140 is short, and thus an amount of light incident on a lower portion of the display panel 110 after having been reflected by the second part 142 can be uniformly adjusted.

Figure 11:
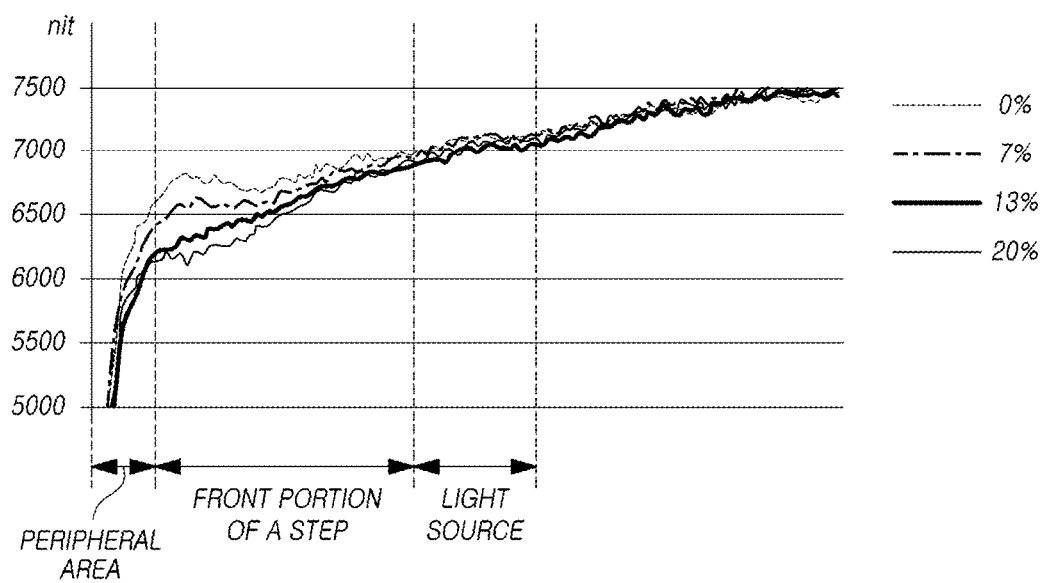
FIG. 11 is a view illustrating the results of measuring the brightness in each area of the backlight unit according to the density of the light absorption pattern applied to the reflective sheet illustrated in FIG. 9.

FIG. 11 is a view illustrating the results of measuring the brightness in each area of the backlight unit according to the density of the light absorption pattern 200 applied to the reflective sheet 140 illustrated in FIG. 9.

Referring to FIG. 11, provided are data on brightness measured at a peripheral area of the backlight unit, at the location of the light source 130, and at an area between the peripheral area and the light source 130, according to an average density of the light absorption pattern 200 disposed in the second part 142 of the reflective sheet 140.

In this case, the peripheral area means an area corresponding to the inclined surface 152 of the cover bottom 150. Additionally, the front portion of the step means an area between a light source 130 located in an outermost area and a boundary between the bottom surface 151 and the inclined surface 152, and the light source 130 means a light source 130 located in the outermost area, among light sources 130 on the bottom surface 151.

In a case where the average density of the light absorption pattern 200 is 0%, the luminance is measured to be higher in an area adjacent to the peripheral area in the front portion of the step than in an adjacent area.

That is, a bright line may appear in an area of the display panel 110 corresponding to an inner side of the inclined surface 152 of the cover bottom 150.

In a case where the average density of the light absorption pattern 200 is increased by 7%, 13%, and 20%, the measured results show that the luminance in an area adjacent to the peripheral area in the front portion of the step is gradually decreased.

In a case where the average density of the light absorption pattern 200 is 20%, the luminance is decreased too much, and therefore even a luminance difference from an adjacent area occurs. In a case where the average density of the light absorption pattern 200 is 13%, the luminance in the front portion of the step not varies abruptly.

Likewise, by adjusting the density of the light absorption pattern 200 disposed in the second part 142 of the reflective sheet 140, the occurring of a bright can be prevented in an area of the display panel 110 corresponding to an inner side of the inclined surface 152 of the cover bottom 150, and the uniformity of light can be improved.

FIG. 12 is a view illustrating the results of measuring display quality in each area of the backlight unit according to the density of the light absorption pattern 200 applied to the reflective sheet 140 illustrated in FIG. 9.

Referring to FIG. 12, in a case where the light absorption pattern 200 is not disposed in the second part 142 of the reflective sheet 140, such as a 0% average density, a bright line appears in the peripheral area.

In a case where the light absorption pattern 200 having a 20% average density is disposed in the second part 142 of the reflective sheet 140, a dark area can be visually recognized in the peripheral area.

In a case where the light absorption pattern 200 having a 13% average density is disposed in the second part 142 of the reflective sheet 140, a bright line not appears and a dark area is not visually recognized, in the peripheral area.

Accordingly, according to the applying of a step structure of the reflective sheet 140, the occurrence of a bright line which can appear in the peripheral area can be prevented, and a uniform brightness can be provided. Thus, the uniformity of light and the luminance can be improved in a slimmed backlight unit and a liquid crystal display device 100 including it.

According to some embodiments of the present disclosure, the luminance non-uniformity in an edge area of the cover bottom 150 can be prevented, by applying a reflective sheet 140 having a step structure to the boundary between the bottom surface 151 and the inclined surface 152 of the cover bottom 150, in a backlight unit having a slimmed structure.

In addition, by disposing the light absorption pattern 200 at a constant density in the step structure of the reflective sheet 140, the occurrence of a bright line caused by the light reflected from the step structure can be prevented. Such a light absorption pattern may be provided in a manner that a black dot pattern is printed, thus a backlight unit having improved luminance and uniformity of light can be provided.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device comprising:
a panel; and
a backlight unit supplying light to a lower portion of the panel, wherein the backlight unit comprises:
a cover bottom including a bottom surface, and at least one inclined surface connected to an edge area of the bottom surface and formed in an inclined shape;
a reflective unit including a first part disposed in the bottom surface, a second part connected to the first part and having a first angle with respect to the first part and a third part connected to the second part and having a second angle with respect to the second part,
wherein the reflective unit includes a light absorption pattern printed on at least a portion of the second part, the light absorption pattern absorbing a portion of the light supplied by the backlight unit; and
at least one light source emitting light on the reflective unit.

2. The display device according to claim 1,
wherein a first angle formed between the first part and the second part is smaller than a second angle formed between the second part and the third part.

3. The display device according to claim 1,
wherein the first part is perpendicularly connected to the second part, and
wherein one end of the third part is connected to the second part, and another end of third part meets an edge area of the cover bottom.

4. The display device according to claim 1,
wherein a point at which the second part and the third part meet each other is located at an upper vertical height than the bottom surface.

5. The display device according to claim 1,
wherein a point at which the second part and the third part meet each other is located at a lower vertical height than the light source.

6. The display device according to claim 1,
wherein density or size of the at least one light absorption pattern printed on a first area at which a straight-line distance between a light source located in an outermost area of the at least one light source and the second part is shorter than a predetermined distance is greater than that of the at least one light absorption pattern printed on a second area at which the straight-line distance is longer than or equal to the predetermined distance.

7. A backlight unit comprising:
a cover bottom including a bottom surface, and at least one inclined surface connected to an edge area of the bottom surface and formed in an inclined shape;
a reflective unit including a first part disposed in the bottom surface, a second part connected to the first part and having a first angle with respect to the first part and a third part connected to the second part and having a second angle with respect to the second part; and
at least one light source emitting light on the reflective unit,
wherein the reflective unit includes a light absorption pattern printed on at least a portion of the second part, the light absorption pattern absorbing a portion of the light emitted by the at least one light source.

8. The backlight unit according to claim 7,
wherein the first part is perpendicularly connected to the second part, and
wherein one end of the third part is connected to the second part, and another end of third part meets an edge area of the cover bottom.

9. The backlight unit according to claim 8,
wherein a point at which the second part and the third part are connected to each other is located between the bottom surface and a top surface of the at least one light source.

10. A backlight unit comprising:
a cover bottom in which at least a part of an area adjacent to an edge area is bent;
a reflective unit disposed in the cover bottom; and
at least one light source emitting light on the reflective unit, wherein the reflective unit is first bent at a portion corresponding to a point at which the cover bottom starts to bend, and second bent between the first bent portion and an edge area of the reflective unit,
wherein the reflective unit includes a light absorption pattern printed on at least a part between the first bent portion and the second bent portion of the reflective unit, the light absorption pattern absorbing a portion of the light emitted by the at least one light source.

11. The backlight unit according to claim 10,
wherein the first bent portion is bent in a first direction and the second bent portion is bent in a second direction opposite to the first direction.

12. The backlight unit according to claim 10,
wherein the second bent portion is spaced apart from the cover bottom and located at a lower vertical height than a top surface of the at least one light source.

13. The display device according to claim 1, wherein the at least one light source includes a LED package and a lens, and wherein the lens includes an upper portion having a concave outer surface and a lower portion having a convex outer surface.

14. The backlight unit according to claim 7, wherein the at least one light source includes a LED package and a lens, and wherein the lens includes an upper portion having a concave outer surface and a lower portion having a convex outer surface.

15. The backlight unit according to claim 10, wherein the at least one light source includes a LED package and a lens, and wherein the lens includes an upper portion having a concave outer surface and a lower portion having a convex outer surface.

* * * * *